(12) United States Patent  
Schöb

(10) Patent No.: US 6,732,634 B2
(45) Date of Patent: May 11, 2004

(54) AUTOMATIC COFFEE BEVERAGE MACHINE, IN PARTICULAR AUTOMATIC ESPRESSO MACHINE

(75) Inventor: Markus Schöb, Uzwil (CH)

(73) Assignee: Eugster/Frismag AG, Romanshorn (CH)

( * ) Notice: Subject to any disclaimer, the term of this patent is extended or adjusted under 35 U.S.C. 154(b) by 96 days.

(21) Appl. No.: 10/046,662

(22) Filed: Jan. 16, 2002

(65) Prior Publication Data

US 2002/0096054 A1 Jul. 25, 2002

(30) Foreign Application Priority Data

Jan. 16, 2001 (DE) ..................................... 201 00 700 U

(51) Int. Cl.[7] ................................................. A47J 31/24
(52) U.S. Cl. .............................. 99/283; 99/280; 99/285
(58) Field of Search ......................... 99/285, 283, 284, 99/280, 291, 279, 290, 293

(56) References Cited

U.S. PATENT DOCUMENTS

| 2,558,522 A | 6/1951 | Knapp |
| 2,761,200 A | 9/1956 | Arnett |
| 2,813,965 A | 11/1957 | Arnett |
| 2,814,317 A | 11/1957 | Gale |
| 2,879,811 A | 3/1959 | Parraga |
| 2,935,010 A | 5/1960 | Arnett et al. |
| 3,194,147 A | 7/1965 | Cowley |
| 3,223,023 A | 12/1965 | Miller |
| 4,572,060 A | 2/1986 | Yung-Kuan |
| 4,662,271 A | 5/1987 | Woltermann |
| 5,498,757 A | 3/1996 | Johnson et al. |
| 5,568,763 A | 10/1996 | Künzler |
| 5,778,765 A * | 7/1998 | Klawuhn et al. .............. 99/290 |
| 5,896,806 A | 4/1999 | Dal Tio |

FOREIGN PATENT DOCUMENTS

| EP | 0 245 197 | 11/1987 |
| WO | WO 00/456685 | 8/2000 |

* cited by examiner

Primary Examiner—Reginald L. Alexander
(74) Attorney, Agent, or Firm—Venable LLP; Norman N. Kunitz

(57) ABSTRACT

An automatic coffee beverage machine, in particular an automatic espresso machine, suitable for selecting a coffee beverage from a plurality of preparation varieties. A plurality of switching contact groups is provided for this, of which respectively one is assigned to a preparation variety and respectively only one can be activated for selecting one of the preparation varieties while the other switching contact groups are blocked. The preparation of the variety selected with one of the switching contacts can subsequently be triggered with a starting contact. To simplify the operation and make the selection clearer, the switching contact groups are designed to form components of a lockable rotary selection switch provided with a turning knob (4). This rotary selection switch is assigned a preparation variety in each lockable rotary position and activates one of the contact groups in each lockable rotary position. The rotary selection switch (4) furthermore comprises an activation element (12) for activating the starting contact.

10 Claims, 2 Drawing Sheets

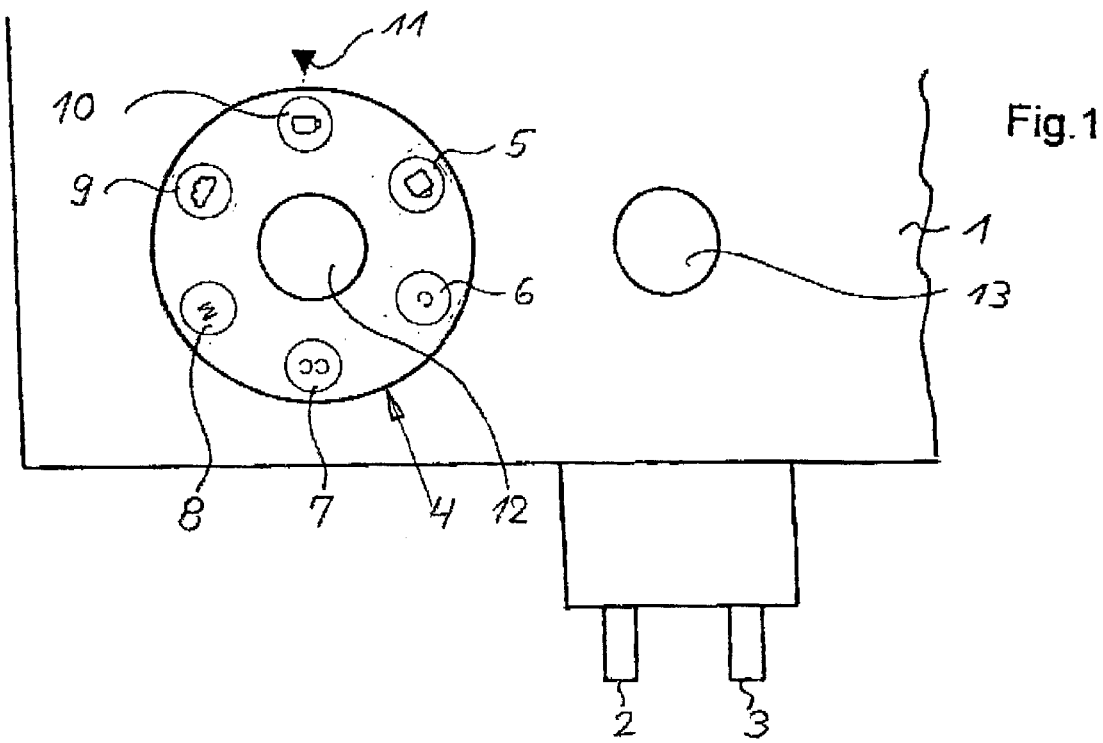
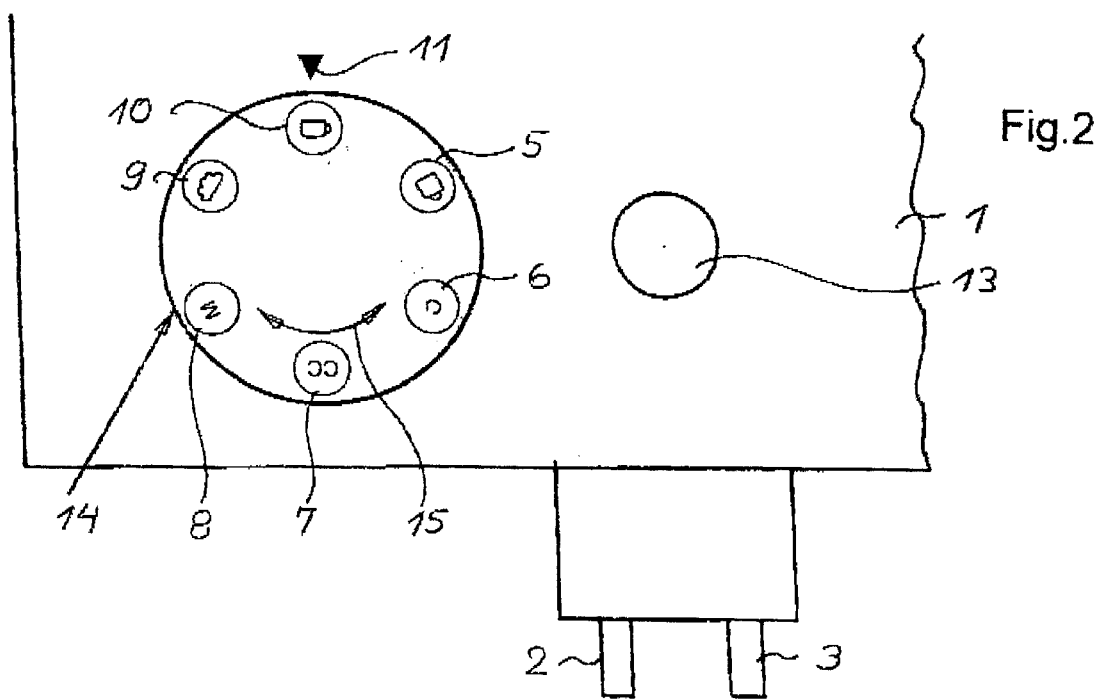

AUTOMATIC COFFEE BEVERAGE MACHINE, IN PARTICULAR AUTOMATIC ESPRESSO MACHINE

BACKGROUND OF THE INVENTION

The invention relates to an automatic coffee beverage machine, in particular an automatic espresso machine, suitable for preparing a hot coffee beverage that can be selected as one variety from a plurality of preparation varieties. A plurality of switching contact groups are provided, of which respectively one is assigned to one preparation variety and respectively one can be activated for selecting one of the varieties to be prepared while the other switching contact groups are blocked. A starting contact is furthermore provided which, when activated, triggers the preparation of one of the varieties selected with the aid of one of the switching contact groups.

Known automatic coffee beverage machines of this type, in particular automatic espresso machines permit the preparation of different varieties of coffee beverages, for example espresso, double espresso, Irish coffee, coffee creme, breakfast coffee, coffee mocha, cappuccino, milk foam.

According to prior art, a push-button arrangement is provided selecting one of these preparation varieties. A push button that activates a switching contact group is assigned to each preparation variety while the activation of the other switching contact groups with the remaining push buttons is blocked. In this context, a switching contact group can also be understood to mean a single switching contact. Thus, the push buttons are used to select one switching contact group from a plurality of switching contact groups. With each switching contact group, an operating cycle of an electric control is selected, which is specified for a respectively desired and selected method of preparation. This operating cycle is started with a starting contact that is activated by a push button, which is separate from the other push buttons.

The high number of push buttons required for preparing a plurality of varieties result in considerable technical expenditure, in particular due to the mutual locking of the push buttons, thus making it more difficult for an operator to have an overview over the selection options. The operation of the machine is not easy, particularly since the brewing operation must also be triggered with the spatially offset button following the selection of a preparation variety.

SUMMARY OF THE INVENTION

It is the object of the present invention to design the selection of the preparation varieties such that it is clearer, to simplify the operation for choosing the selected preparation variety and to reduce the costs of producing the automatic coffee beverage machine.

This object is solved according to the invention in that the switching contact groups are components of a rotary selection switch provided with a turning knob, which is assigned in each lockable rotary position to a preparation variety. The object is furthermore solved in that one of the contact groups is activated in each lockable rotary position and that the rotary selection switch comprises at least one activation element for activating the starting contact.

A rotary selection switch of this type makes it easier to view the selection options since the data of interest relating to possible beverage varieties or the respective symbols can be combined on the turning knob of the rotary selection switch or near it. The operation is made easier by the fact that only one rotary selection switch must always be turned for the selection, preferably in each of two possible turning directions. The operating cycle can be started easily with the starting contact that is also arranged near the rotary selection switch. Since the rotary selection switch can activate only one contact group in each lockable rotary position, no additional means for a mutual locking of the contact groups are required. In addition, the rotary selection switch permits an aesthetically pleasing design for the automatic coffee beverage machine.

According to one embodiment of the invention, the operation of the automatic coffee beverage machine can be simplified following the selection or pre-selection of a desired preparation variety. The element for activating the starting contact in that case also involves the displaceable positioning of at least one component of the rotary selection switch, which makes contact with the starting contact by being pushed in. In particular, the displaceable component of the rotary selection switch can be its selector shaft to which the rotary knob is attached. The pre-selected operating cycle subsequently can be started in an operator-friendly manner in that the same turning knob, turned to a specific rotary position for selecting the preparation variety, is subsequently pushed in, if necessary without first releasing the turning knob. As a result, the pre-selected operating cycle is started.

However, according to a second embodiment of the invention, the activation element can also be a start button arranged in the center of the turning knob, which is connected to the starting contact. The start button is easy to see and can be reached quickly once the turning knob is adjusted.

For a clear and conspicuous presentation of the selection options for the preparation varieties, but also of the selected variety, a display arrangement is fixedly attached to the housing in the area surrounding the rotary knob. This display is provided with respectively one symbol for each preparation variety that can be selected, to which a marking on the rotary knob can be adjusted by turning the rotary knob. The advantage of this modified embodiment is that the illumination for the display is also installed fixedly in the machine and the turning knob consequently does not require a current supply.

According a feature of the invention, a selection display with one symbol for each preparation variety that can be selected can alternatively be arranged in a circumferential direction on the turning knob of the rotary selection switch, such that respectively one segment of the selection display can be set to a selected, fixed marking. This modified version has the advantage that the selected preparation variety is always visible on the marking that is affixed to the machine.

The symbol for the selected preparation variety is particularly easy to read according to a further feature of the invention in that backlighting is provided for the symbol respectively adjusted with the turning knob of the rotary selection switch.

However, for embodiments where the symbols for the preparation varieties are visible on the turning knob and can be adjusted with this knob, only one illumination means is necessary, for example, a light-emitting diode arranged behind the symbol positioned closest to the mark indicating the selected position of the knob. Otherwise, a reliable light-emitting diode with low energy consumption is advantageously arranged behind each symbol for the selection display.

Three embodiments of the invention are described in the following with the aid of a drawing with three Figures, from which additional features and advantages of the invention can follow.

BRIEF DESCRIPTION OF THE DRAWINGS

FIG. 1 is a frontal view of a first embodiment of a turning knob for the rotary selection switch with symbols, shown as a sectional detail of an automatic espresso machine.

FIG. 2 shows a modified version of the turning knob for the rotary selection switch.

The same parts are provided with the same reference numbers in the Figures. The reference number 1 In FIG. 1 refers to a section of an automatic espresso machine housing, in which the beverage spouts 2 and 3 project from the bottom.

Figure 3:
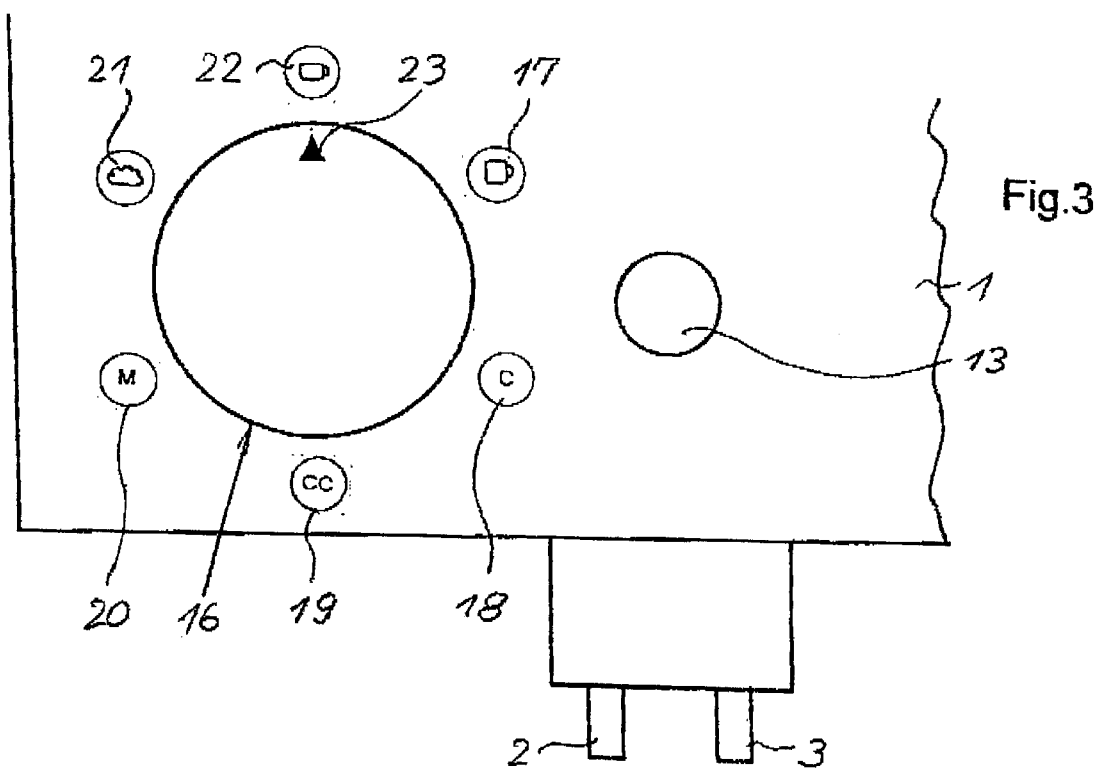
FIG. 3 shows a second modified version of the turning knob with symbols that are affixed to the machine in the area surrounding the turning knob.

A turning knob 4 of a rotary selection switch can be used to adjust or pre-select the desired coffee beverage or a preparation variety to be obtained at the beverage spouts 2 and 3. The rotary selection switch itself, in particular its switching contact groups, are hidden behind the turning knob 4 or the automatic espresso machine housing 1. The symbols 5–10 for the different preparation varieties, which can be adjusted with the turning knob 4, are visible on a frontal area of turning knob 4 that is not designated. A marking 11 is affixed above the turning knob 4 to the automatic espresso machine housing 1. This marking clearly shows that the preparation variety adjusted with the turning knob 4 is the preparation variety for which the symbol is located directly below the marking 11, in this case the symbol 10.

A start button 12 is arranged displaceable in the center of turning knob 4 and is used for starting an operating cycle, based on the preparation variety that is adjusted or pre-selected in this way. The start button is connected to a starting contact—also not visible herein—such that pushing in the start button will activate the starting contact and initiate the operating cycle for the preparation variety, so that finally the preparation variety flows from the beverage spouts 2 and 3. An ON and OFF switch 13 for the automatic espresso machine can also be seen in FIG. 1, which can be arranged close to its center or to the start button 12 because the turning knob 4 of the rotary selection switch requires little space.

According to one design modification shown in FIG. 2, the turning knob of a rotary selection switch is given the reference number 14. The turning knob again is provided on its front with non-depicted symbols (5–10) for the preparation varieties, which can be adjusted by turning the knob. The symbols, in turn, can be assigned a marking that is not shown herein and is affixed to the housing. The beverage variety is selected by turning the knob in one of two possible turning directions, in accordance with a double arrow 15. In order to trigger an operating cycle for the selected preparation variety, the complete turning knob 14 can be displaced axially, perpendicular to the drawing plane. The turning knob 14 in particular can be pushed in for triggering the selection. The knob can subsequently return under the effect of a spring force to its axial starting position. This modified version has the advantage that the beverage preparation for the selected preparation variety can be started without the operator having to release the turning knob, which may have been gripped prior to the selection operation. In contrast, an axial positioning of the turning knob 4 is omitted with the embodiment according to FIG. 1.

The turning knob for a rotary selection switch of a second modified embodiment according to FIG. 3 is given the reference number 16. With this embodiment, the symbols 17–22 for the various beverage varieties that can be selected with the rotary selection switch are not integrated into the turning knob, but are arranged outside of the turning knob 16, locally fixed in the automatic espresso machine housing 1. Thus, a relatively large surface is available for this arrangement. Selected is the beverage variety, for which the symbol is closest to a marking 23 that can be adjusted with the turning knob 16. The turning knob in this case can also be axially displaceable for triggering the start.

What is claimed is:

1. An automatic coffee beverage machine, in particular an automatic espresso machine, suitable for brewing a coffee beverage that can be selected from a plurality of preparation varieties, wherein:

a plurality of switching contact groups is provided, respectively one of which is assigned to one preparation variety and respectively only one of which can be activated for selecting one of the preparation varieties while the other switching contact groups are blocked;

a starting contact is furthermore provided which can be activated independently of activation of said switching contact groups and which, when activated, triggers the preparation of the variety selected with one of the switching contact groups;

the switching contact groups are components of a rotary selection switch provided with a turning knob, which rotary selection switch is assigned a preparation variety in each lockable rotary position and activates one of the contact groups in each lockable rotary position; and, the rotary selection switch further comprises at least one activation element for activating the starting contact independent of each rotary position of said turning knob and of said rotary switch.

2. An automatic coffee beverage machine according to claim 1, wherein in order to activate the starting contact, the activation element involves the axially displaceable positioning of at least one component of the rotary selection switch, which is connected to the starting contact.

3. An automatic coffee beverage machine according to claim 1, wherein a display is affixed to the housing area surrounding the turning knob for the rotary selection switch, which display shows respectively one symbol for each preparation variety that can be selected, to which a marking on the turning knob can be set.

4. An automatic coffee beverage machine according to claim 3 wherein a light is positioned behind the symbol that is respectively adjusted with the turning knob of the rotary selection switch to backlight the symbol.

5. An automatic coffee beverage machine according to claim 1, wherein a display with respectively one symbol for each preparation variety that can be selected is arranged on the turning knob of the rotary selection switch in circumferential direction, such that respectively one symbol of the display for selection can be set to a marking, which is affixed to the housing.

6. An automatic coffee beverage machine according to claim 5 wherein a light is positioned behind the symbol that is respectively adjusted with the turning knob of the rotary selection switch to backlight the symbol.

7. An automatic coffee beverage machine, in particular an automatic espresso machine, suitable for brewing a coffee beverage that can be selected from a plurality of preparation varieties, wherein:

a plurality of switching contact groups is provided, respectively one of which is assigned to one preparation variety and respectively only one of which can be activated for selecting one of the preparation varieties while the other switching contact groups are blocked;

a starting contact is furthermore provided which, when activated, triggers the preparation of the variety selected with one of the switching contact groups;

the switching contact groups are components of a rotary selection switch provided with a turning knob, which rotary selection switch is assigned a preparation variety in each lockable rotary position and which activates one of the contact groups in each lockable rotary position, and, the rotary selection switch further comprises at least one activation element for activating the starting contact, with the activation element being a start button that is positioned in the center of the turning knob and is connected to the starting contact.

8. An automatic coffee beverage machine, in particular an automatic espresso machine, suitable for brewing a coffee beverage that can be selected from a plurality of preparation varieties, wherein:

a plurality of switching contact groups is provided, respectively one of which is assigned to one preparation variety and respectively only one of which can be activated for selecting one of the preparation varieties while the other switching contact groups are blocked;

a starting contact is furthermore provided which, when activated, triggers the preparation of the variety selected with one of the switching contact groups;

the switching contact groups are components of a rotary selection switch provided with a turning knob, which rotary selection switch is assigned a preparation variety in each lockable rotary position and which activates one of the contact groups in each lockable rotary position, the rotary selection switch further comprises at least one activation element for activating the starting contact;

a display with respectively one symbol for each preparation variety that can be selected is associated with the turning knob of the rotary switch; and, a light is positioned behind the symbol that is respectively adjusted with the turning knob of the rotary selection switch to backlight the symbol.

9. An automatic coffee beverage machine according to claim 8, wherein only one light-emitting diode for providing backlighting is provided, which diode is positioned fixedly attached to the machine behind the turning knob, in a position where respectively one of the symbols can be adjusted, which is closest to a marking affixed to the housing.

10. An automatic coffee beverage machine, in particular an automatic espresso machine, suitable for brewing a coffee beverage that can be selected from a plurality of preparation varieties, wherein:

a plurality of switching contact groups is provided, respectively one of which is assigned to one preparation variety and respectively only one of which can be activated for selecting one of the preparation varieties while the other switching contact groups are blocked;

a starting contact is furthermore provided which, when activated, triggers the preparation of the variety selected with one of the switching contact groups;

the switching contact groups are components of a rotary selection switch provided with a turning knob, which rotary selection switch is assigned a preparation variety in each lockable rotary position and which activates one of the contact groups in each lockable rotary position, the rotary selection switch further comprises at least one activation element for activating the starting contact;

a display is affixed to the housing area surrounding the turning knob for the rotary selection switch, which display shows respectively one symbol for each preparation variety that can be selected, to which a marking on the turning knob can be set; and, a light-emitting diode is arranged behind each symbol of the display for selection.

* * * * *